United States Patent [19]

Blunden

[11] Patent Number: 4,674,929
[45] Date of Patent: Jun. 23, 1987

[54] RAILROAD CAR WITH CHOCK BLOCK APPARATUS FOR SECURING VEHICLES BEING TRANSPORTED

[75] Inventor: Donald J. Blunden, Plymouth, Mich.
[73] Assignee: Thrall Car Manufacturing Company, Chicago Heights, Ill.
[21] Appl. No.: 789,135
[22] Filed: Oct. 18, 1985
[51] Int. Cl.[4] ............................. B60P 3/07; B60T 3/00
[52] U.S. Cl. ........................................ 410/30; 188/36; 410/26
[58] Field of Search ....................................... 410/7–12, 410/19, 24, 26, 30; 188/36; 105/378; 206/335

[56] References Cited

U.S. PATENT DOCUMENTS 1,778,162 10/1930 Mills et al. ...................... 410/30 X
3,605,636 9/1971 Blunden et al. .................. 410/26 X

FOREIGN PATENT DOCUMENTS 129424 1/1978 German Democratic Rep. ... 410/30
967798 8/1964 United Kingdom ................... 410/26

Primary Examiner—Randolph A. Reese
Attorney, Agent, or Firm—Marshall, O'Toole, Gerstein, Murray & Bicknell

[57] ABSTRACT

A railroad car having at least one deck for supporting and transporting four-wheel vehicles such as automobiles and trucks; a pair of spaced apart first and second parallel tracks, secured to the deck longitudinally of the railroad car, having clearance for the two wheels on one side of the vehicle to roll between the tracks; a pair of movable chock blocks for each vehicle transported on the deck to secure the vehicle against longitudinal movement; each chock block including a bar with a first end and a second end; the bar first end being permanently secured to the first track so that it is not readily removable from the first track but so that the bar first end can be moved along the longitudinal axis of the track and the bar also can be rotated from about lateral to about parallel to the track; the bar first end having a latch for releasably securing the bar first end in a fixed position along the first track; and the bar second end having a device for releasably securing the bar second end in a fixed position along the second track.

17 Claims, 16 Drawing Figures

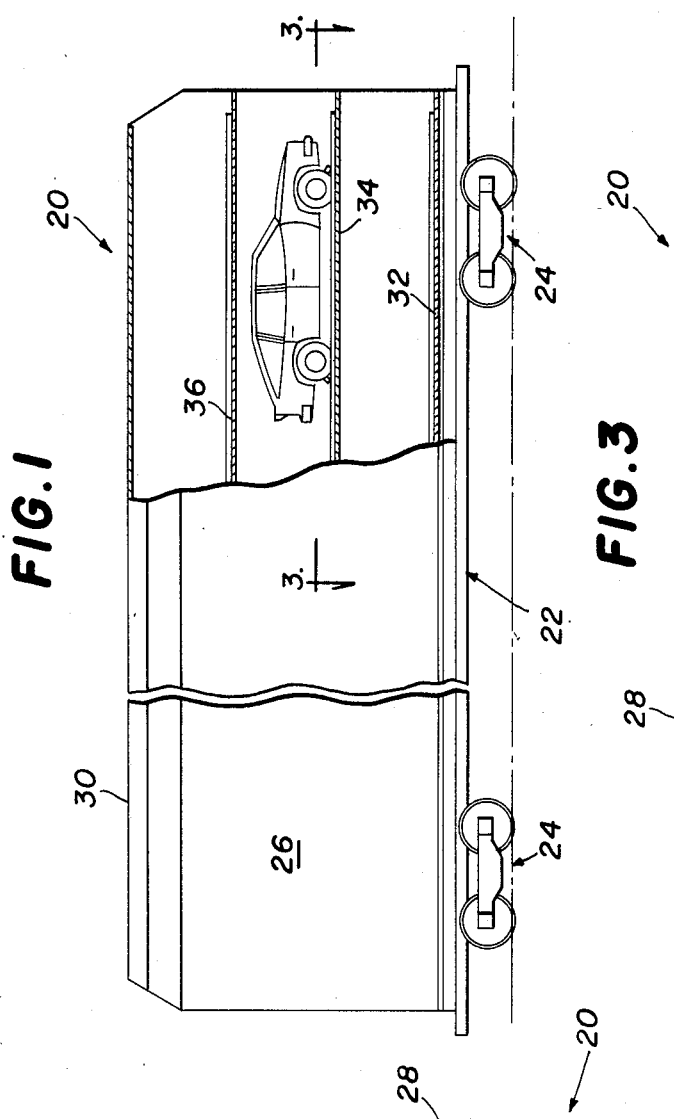
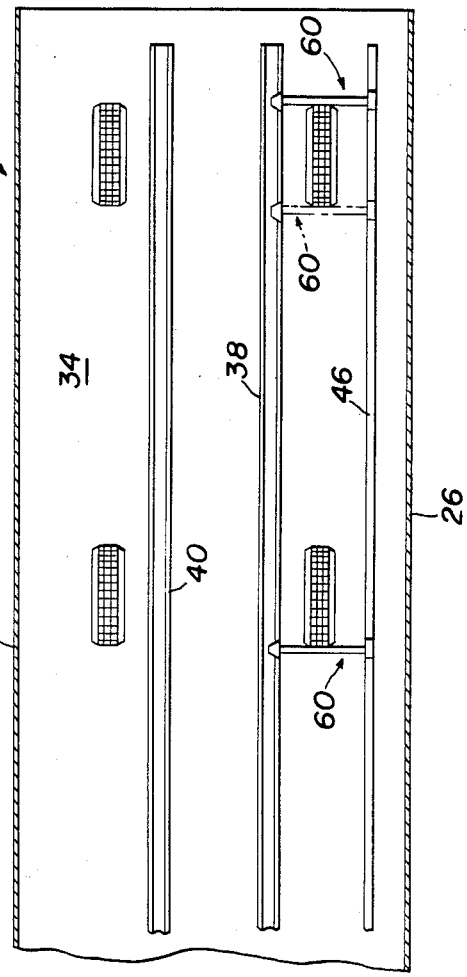
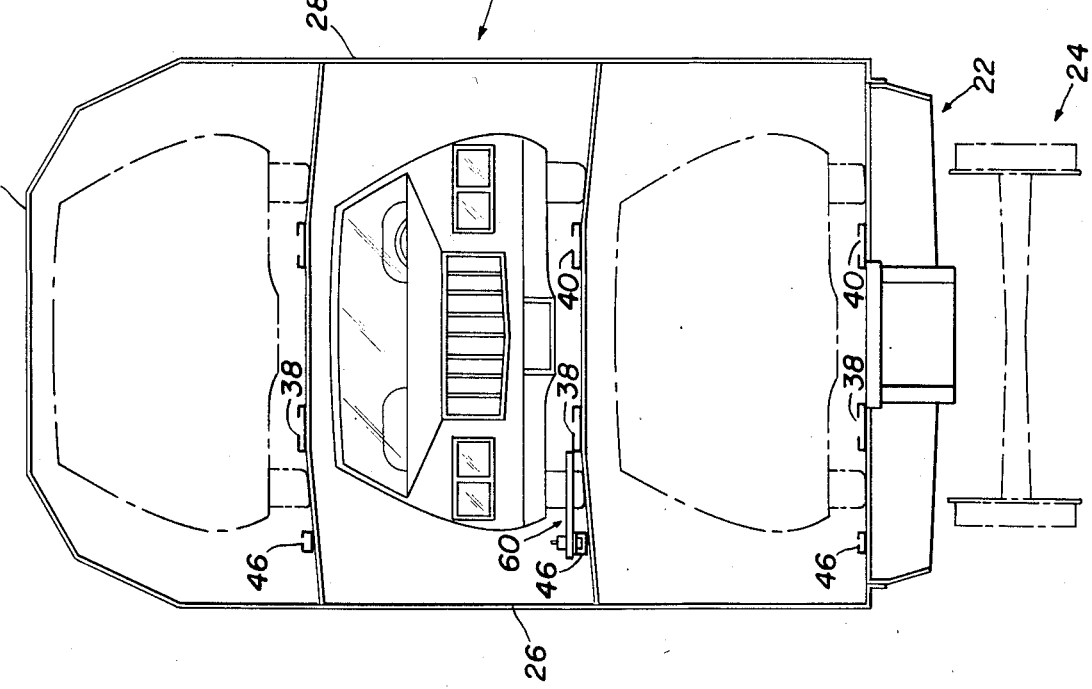

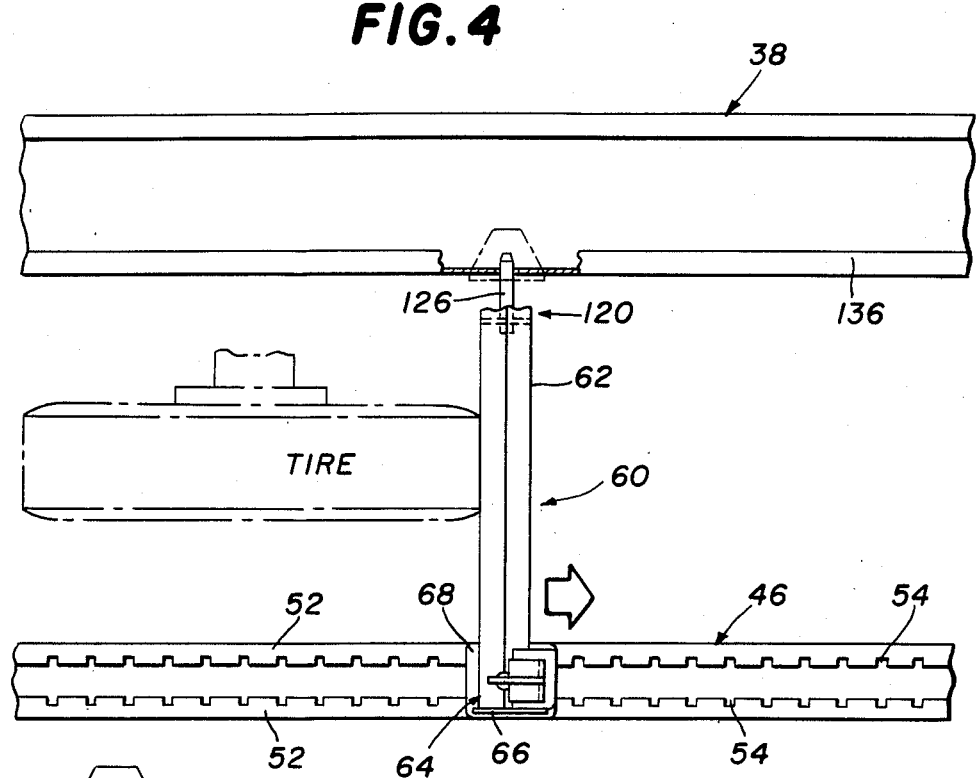
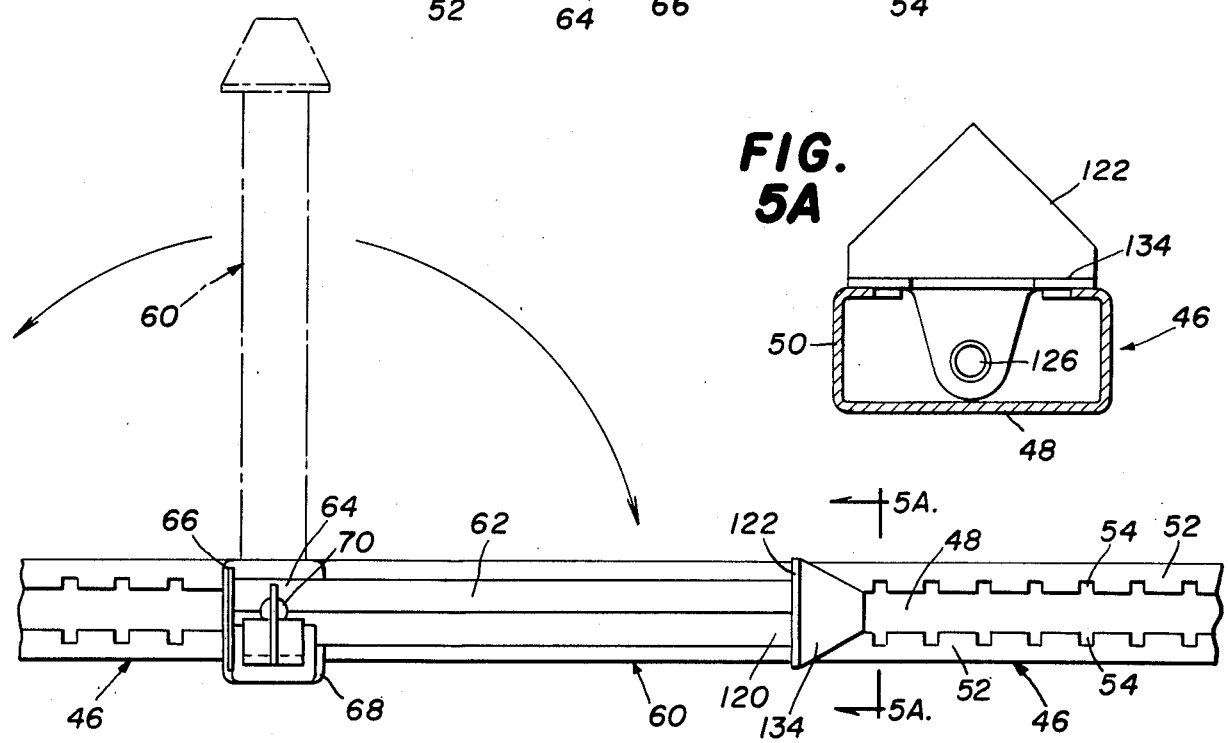

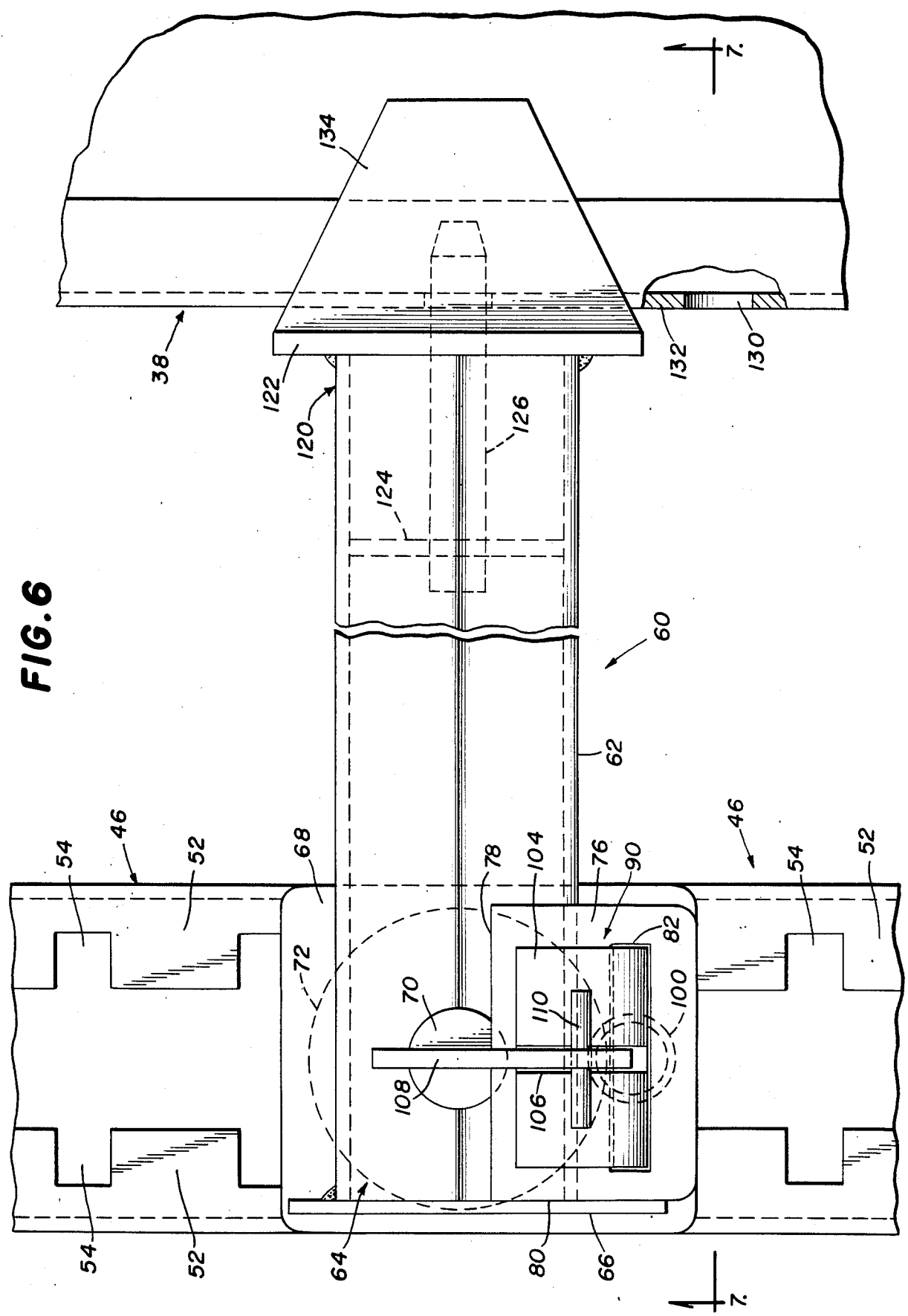

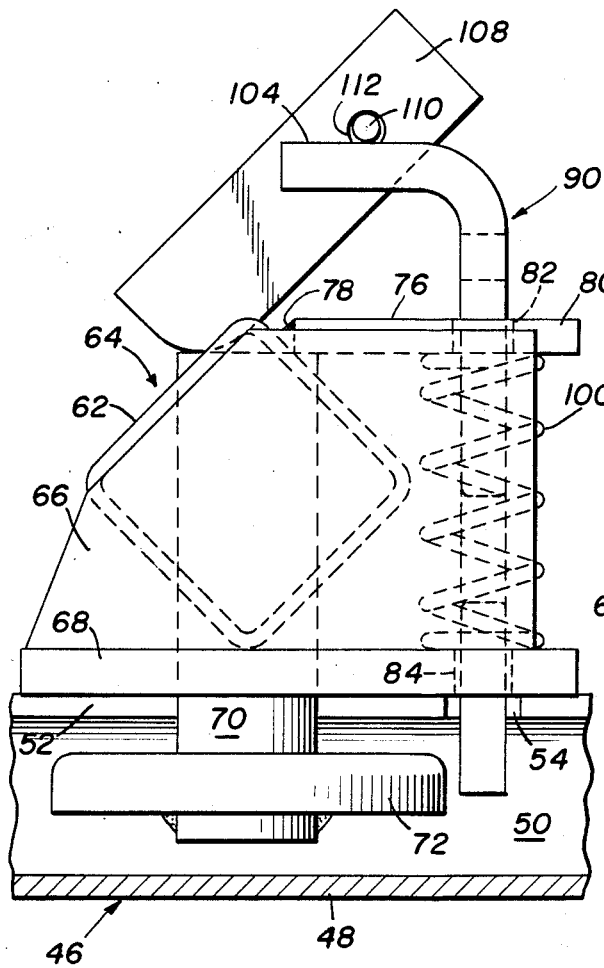
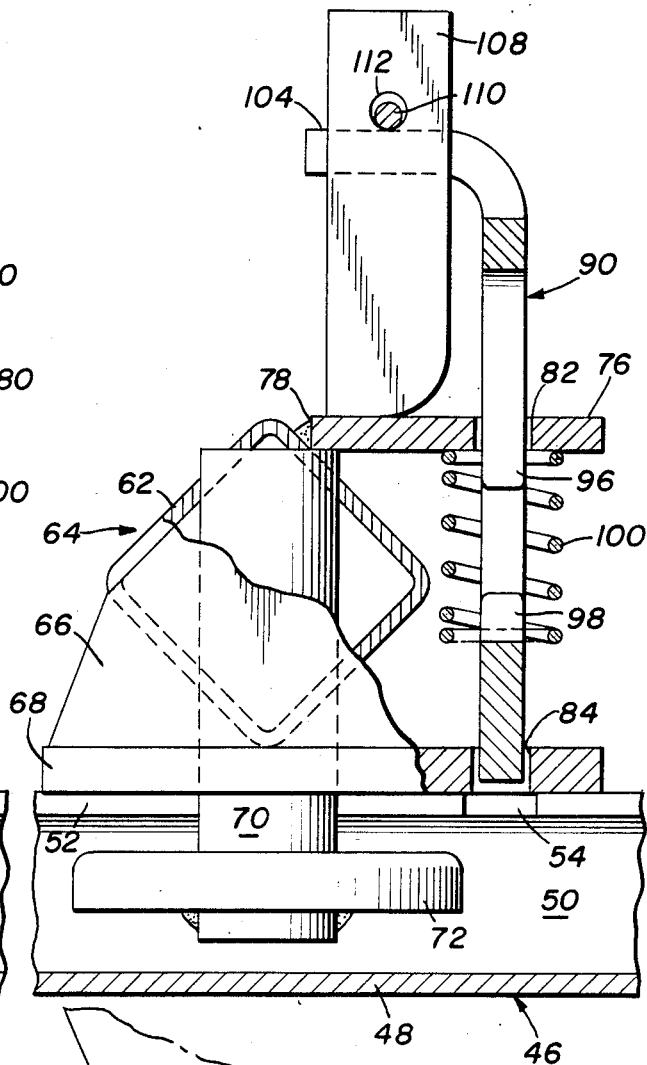
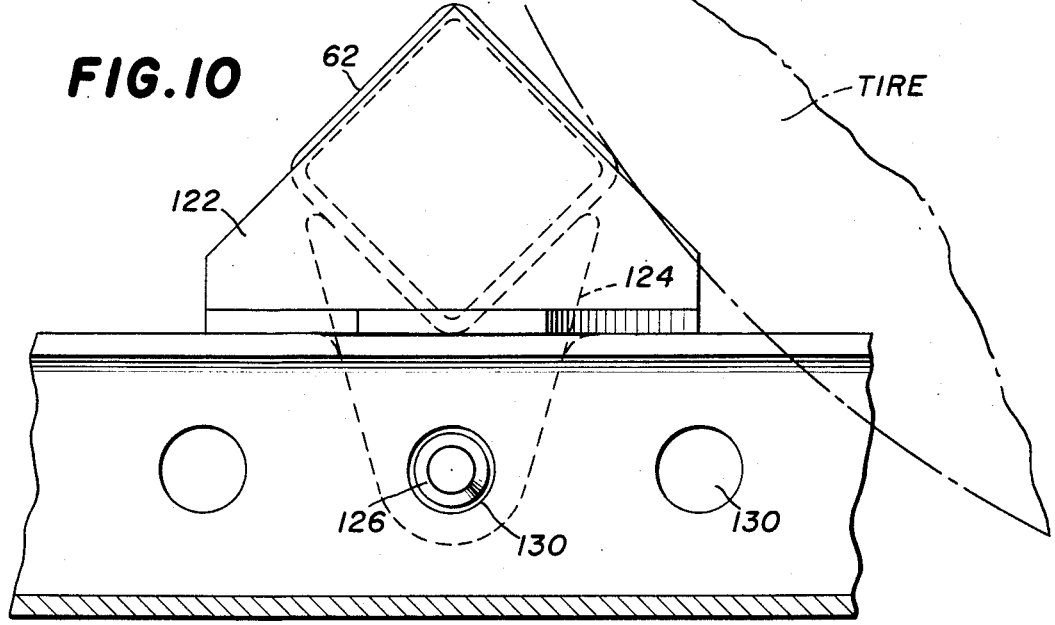

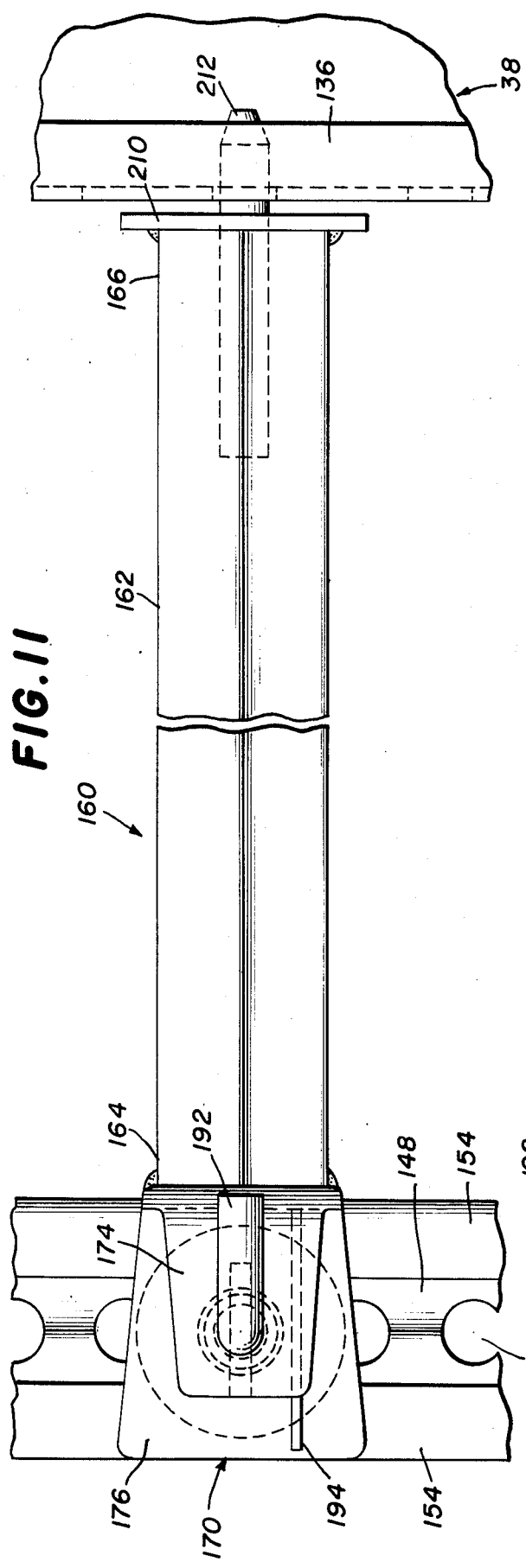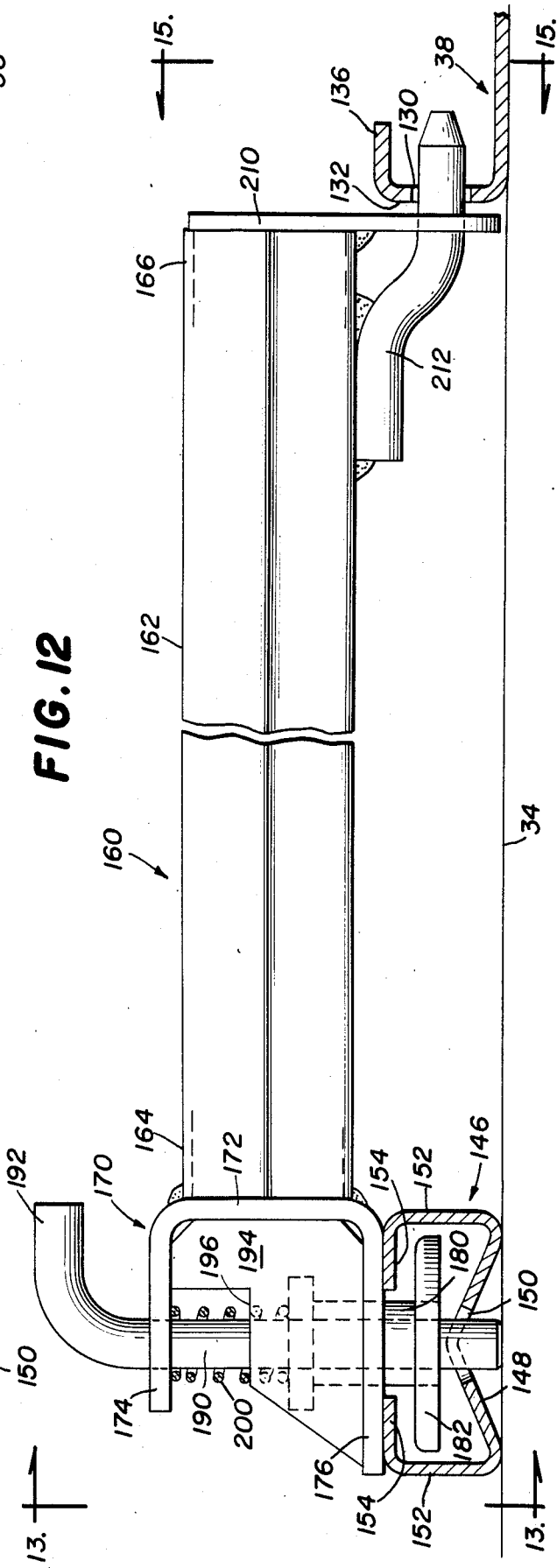

RAILROAD CAR WITH CHOCK BLOCK APPARATUS FOR SECURING VEHICLES BEING TRANSPORTED

This invention relates to railroad cars used to transport vehicles such as automobiles and trucks. More particularly, this invention is concerned with improved chock block apparatus for securing vehicles being transported on such railroad cars.

BACKGROUND OF THE INVENTION

Special railroad cars are used to transport vehicles such as automobiles and trucks from manufacturing plants to distribution centers. Such railroad cars are often referred to as auto rack cars. The number of decks which support the vehicles depends on the type of vehicles to be transported. Although some cars have a single deck it is more common to have two or three decks. Each deck will usually carry about four to six vehicles in the United States.

It is necessary to tie down or secure each vehicle to its supporting deck so that it remains in position while the railroad car moves from its point of loading to its destination. The system used to tie down each vehicle must be able to hold it securely even when the railroad car is subjected to buff and draft forces, as well as when it rocks, rolls and bumps.

One of the ways widely used in the United States to tie down vehicles requires a pair of parallel tracks, spaced apart about forty inches outside, on each deck. The four wheels of each vehicle span the tracks and thus provide centering guides when the vehicles are driven onto the railroad car in column formation in so-called circus loading. After a vehicle is properly positioned on a deck it is pulled down tightly by use of four chains. Two chains are used at each end. Each chain free end is hooked to the vehicle frame or body adjacent a track. Each chain extends downwardly to a carriage releasably slidable in a track and carrying a winch for tightening the chain. Such apparatus is disclosed in U.S. Pat. Nos. 3,566,803; 3,564,577; 3,374,008 and 3,673,969.

Although the described tie down apparatus has been successfully used for many years, recent vehicle structural changes in some models have lowered road clearance, indicating that alternative systems should be used at least for such models. Thus, in many cases it is no longer desirable to use a tie down system which pulls the vehicle body down and compresses the vehicle springs because this lowers the clearance between the vehicle transmission and the deck. When the railroad car bumps and pitches, the vehicle bottom can hit the deck and cause damage to the vehicle. Additionally, to withstand the tension applied to the underbody of the vehicle where the hooks are attached, special reinforcement must be added with increased cost solely to transport the vehicle and with no general benefit to the vehicle once it reaches its destination.

A further disadvantage of the prior art tie down system is that a laborer must have access to both sides of the vehicle; thus, space must be provided for him to work and walk on both sides. For some vehicles it is considered that tie down on one side only would be adequate if a suitable system were available. This would reduce the laborer's time and lower costs.

Another disadvantage is use of a winch to tension the chain since this requires that the laborer carry a crank with him to operate the winch. Since only a narrow path is present in the railroad car on each side of the vehicle, it is quite common for the laborer to accidently strike the vehicle with the crank as he walks along and dent the body or chip the paint thereby making the vehicle unattractive to a buyer.

From the above discussion it is believed clear that alternative tie down apparatus for vehicles transported by railroad car which eliminates some or all of the disadvantages of the prior art systems is needed.

SUMMARY OF THE INVENTION

According to the invention, a railroad car is provided having at least one deck for supporting and transporting four-wheel vehicles such as automobiles and trucks; a pair of spaced apart first and second parallel tracks, secured to the deck longitudinally of the railroad car, having clearance for the two wheels on one side of the vehicle to roll between the tracks; a pair of movable chock block means for each vehicle transported on the deck to secure the vehicle against longitudinal movement; each chock block means including a bar with a first end and a second end; the bar first end having means which permanently secures the bar first end to the first track so that it is not readily removable from the first track but so that the bar first end can be moved along the longitudinal axis of the track and the bar also can be rotated from about lateral to about parallel to the track; the bar first end having means for releasably securing the bar first end in a fixed position along the first track; and the bar second end having means for releasably securing the bar second end in a fixed position along the second track.

A vehicle is secured in place by at least (1) laterally positioning a bar in front of a wheel and another bar in back of the same wheel, (2) laterally positioning a bar in front of one wheel and laterally positioning another bar in back of the other wheel on the same side of the vehicle and with both bars located between the wheels, or (3) positioning the bars as in (2) but outside the wheels. If desired, wheels on both sides of the vehicle can be secured in place in the same way. Also, all four wheels can be individually secured in place by bars in front and in back of each wheel.

The first track can be a channel member with inwardly directed horizontal flanges at the top which terminate in spaced apart position and define a longitudinal gap; the means which secures the bar first end to the first track can include a vertical member fixedly attached to the bar and extending downwardly through the gap into the space enclosed by the channel; and the vertical member can have a horizontal plate, fixedly connected to it in the space enclosed by the channel, which can be rotated about 90° about a vertical axis. The plate desirably is circular although it can be a polygon.

The means for releasably securing the bar first end in a fixed position along the first track can include a bracket connected to the bar first end; a latch supported by the bracket; and means to displace the latch into releasable fixed engagement with latch engaging means on the first track. Spring means can be used to displace the latch into releasable fixed engagement with the first track. Furthermore, means can be included to retain the latch out of engagement with the first track.

The second track can have a series of spaced-apart holes; and the bar second end means for releasably securing the bar second end in a fixed position along the second track can include at least one pin which engages a hole in the second track.

The second end of the bar can be provided with means which fits in the gap of the first track when the bar is parallel to the track to thereby stow the bar out of the way so vehicles can roll unobstructed on the deck.

BRIEF DESCRIPTION OF THE DRAWINGS

FIG. 1 is a side elevation of a railroad car having chock block apparatus connected to two tracks on the car decks according to the invention;

FIG. 2 is an end view of the railroad car shown in FIG. 1;

FIG. 3 is a sectional view of FIG. 1 taken along the line 3—3;

FIG. 4 is a plan view of one embodiment of chock block apparatus, according to the invention, connected to two tracks on a railroad car deck;

FIG. 5 is a plan view showing the chock block apparatus of FIG. 4 in stowed position;

FIG. 5A is a sectional view of FIG. 5 taken along the line 5A—5A;

FIG. 6 is an enlarged plan view of the chock block apparatus shown in FIGS. 4 to 5A;

FIG. 8 is a sectional view of FIG. 7 taken along the line 8—8;

FIG. 9 is similar to FIG. 8 but it shows the latch out of engagement with the track;

FIG. 10 is a sectional end view of FIG. 7 taken along the line 10—10 of FIG. 7;

FIG. 11 is a plan view of a second embodiment of chock block apparatus connected to two tracks on a railroad car deck according to the invention;

FIG. 12 is a side elevational view, partially in section, of the chock block apparatus shown in FIG. 11;

DETAILED DESCRIPTION OF THE DRAWINGS

Figure 7:
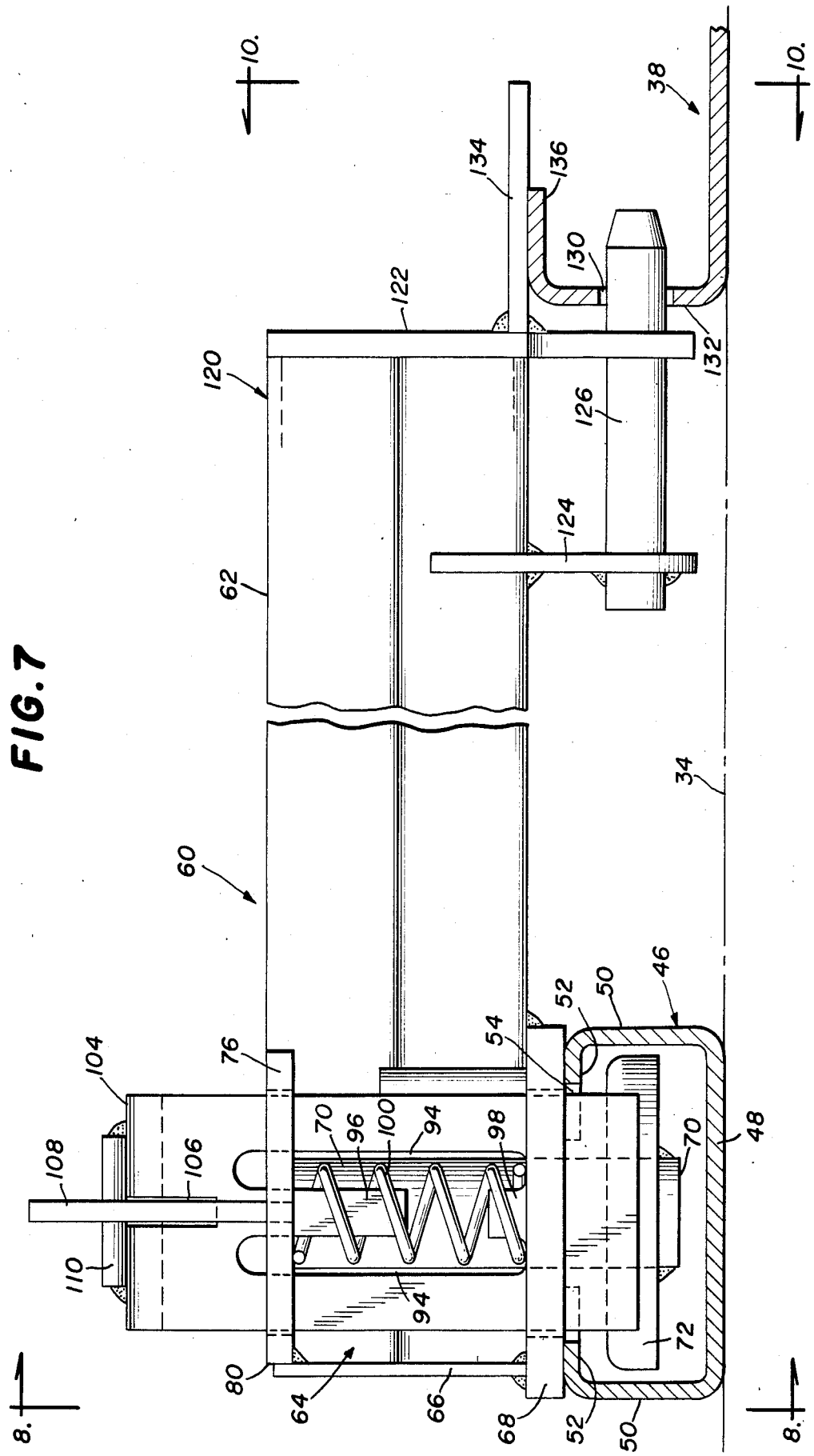
FIG. 7 is a sectional view of FIG. 6 taken along the line 7—7.

To the extent it is reasonable and practical the same or similar elements or parts which appear in the various views of the drawings will be identified by the same numbers.

With reference to FIGS. 1 to 3, the railroad car 20 has an underframe 22 supported by a pair of wheel trucks 24. Extending upwards from underframe 22 are sidewalls 26,28 to which roof 30 is connected.

The railroad car 20 has three decks 32,34 and 36. Deck 32 is supported on underframe 22 and decks 34 and 36 are supported by column members, not shown, along the sides of the car 20. The height between adjacent decks and between the top deck and the car roof is approximately equal.

The railroad cars now used in the United States to transport vehicles generally have two spaced apart longitudinal tracks 38,40 (FIGS. 1 to 3) on each deck for use in securing vehicles in place. They are spaced about forty inches apart, outside dimension, so that they lie between the pair of wheels on each side of the vehicles. At least one of these tracks is suitably employed with the chock block apparatus provided by the invention. For convenience, track 38 is selected and in the subsequent description the invention will be discussed primarily with respect to it. It should be understood, however, that in new railroad cars track 38 can be a new track and that track 40 may or may not be included.

As shown in FIGS. 4 and 5, a track 46 is positioned on each deck 32,34,36. Each track 46 is located parallel to and spaced outwardly of track 38 so as to provide a wide enough path between tracks 38 and 46 for a pair of wheels on one side of vehicles with different tread spans to roll along the deck. Track 46 is channel shaped with a flat bottom 48, side walls 50 and inwardly directed horizontal top flanges 52 which terminate in edges spaced apart from each other, thereby defining a longitudinal gap. The inner edge of each flange 52 has spaced apart slots 54 which are desirably located opposite one another.

A chock block apparatus 60 is secured to track 46 so that it is not readily removable therefrom but so that it can be moved along the longitudinal axis of the track and be rotated from about lateral to about parallel to track 46 (FIGS. 4 to 5A). The chock block apparatus 60 includes a bar 62. The bar 62 is shown as a tube which is square in lateral section and set with a corner edge upward with the tube viewed horizontal. A first end 64 of bar 62 has a vertical plate 66 (FIGS. 6 and 7) joined thereto. The bottom edge or corner of the first end 64 of bar 62 is joined to horizontal plate 68.

Vertical circular rod 70 extends through and is fixedly connected to bar 62 first end 64, plate 68 and horizontal circular disc 72. The plate 68 and disc 72 are spaced apart on rod 70 a sufficient distance for flanges 52 to extend between them with adequate clearance for longitudinal movement along the track without binding. The diameter of disc 72 is large enough to prevent it from being removed through the gap defined by the inner edges of flanges 52, thereby preventing removal of chock block apparatus 60 from track 46.

Horizontal plate or bracket 76 is joined at its rear edge 78 (FIGS. 8 and 9) to the upper portion of bar 62. Additionally, side edge 80 of plate 76 is joined to vertical plate 66 near the top. Plate or bracket 76 is provided with a rectangular slot 82 which is vertically aligned with a slot 84 of the same size in plate 68 (FIGS. 6, 8 and 9).

Latch plate 90 is vertically positioned and dimensioned to slide loosely in slots 82 and 84. The lower end of plate 90 fits into opposing slots 54 in track 46 when in locking position.

Latch plate 90 has a cut-out area 94 (FIG. 7) in the general shape of an H, thereby providing a downwardly projecting finger 96 which extends into the upper end of coil spring 100, and an upwardly projecting finger 98 which extends into the lower end of spring 100. The fingers 96 and 98 maintain compression spring 100 in place yet permit its ready removal. When spring 100 is removed, latch plate 90 can then be removed from the apparatus.

The upper end 104 of latch plate 90 is bent horizontal and is provided with a slot 106. Tongue 108 fits into slot 106 and is pivotally mounted to the top of latch upper end 104 by pin 110, which is welded thereto, extending loosely though a hole 112 in the tongue 108 (FIGS. 6 to 9). The hole 112 is located in the upper portion of tongue 108 so that when unhindered it will pivot by gravity into a vertical position (FIG. 9). When latch 90 is in locking position it will be positioned as illustrated in FIG. 8 and tongue 108 will rest freely on the top of the adjoining structure. When latch 90 is pulled vertically upwardly by placing two fingers under latch upper end 104, the tongue 108 pivots automatically into vertical position so that the lower end of the tongue contacts the top of plate 76. When the upward pull on latch 90 is then released, tongue 108 prevents the force of gravity and of compressed spring 100 from moving the latch downwardly. With the latch 90 held in unlocked position, the bottom end of latch 90 is held in slot 84 above flanges 52. The bar 62 can then be moved relative to track 46.

The second end 120 of bar 62 is provided with a vertical plate 122. Spaced inwardly from plate 122 is a second vertical plate 124 which is joined to the lower portion of bar 62. Horizontal pin 126 extends through the lower part of plates 122 and 124 and projects outwardly past plate 122 for a distance sufficient to extend into a hole 130 in the wall 132 of track 38 (FIG. 7). Horizontal plate 134 is joined to the front face of plate 122 and extends outwardly to rest on flange 136 of track 38.

The described chock block apparatus 60 is shown in position of use in FIG. 4. To remove the apparatus from use, latch 90 is first moved to unlocking position. The first end 64 of bar 62 is then moved away from the tire by sliding it along track 46 in the direction of the arrow for a sufficient distance to withdraw the end of pin 126 from hole 130. With the pin 126 freed from the hole, further sliding of the first end 64 along the track causes bar 62 to move away from the tire and causes end 120 to move counterclockwise toward the track 46. End 120 can then be lifted and placed in stowed position in track 46. The apparatus can also be rotated clockwise into stowed position as shown in FIG. 5. As shown in FIG. 5A, when the chock block apparatus 60 is in stowed position the bottom portions of plates 122 and 124 fit into the gap between flanges 52 of track 46 and prevent the bar 62 from swinging out. The chock block apparatus is placed in use to secure a vehicle in place by reversing the described operations.

Generally, at least two of the described chock block apparatus 90 are connected to track 46 and used to secure a vehicle in place on a railroad car deck. The vehicle tires can be chocked only on one side of the vehicle or on both sides and respective tires can be chocked only in front or back, or both in front and back, in any combination considered suitable to hold the vehicle in place. It should be understood that to chock a vehicle on both sides that another track 46 must be positioned outwardly of track 40 and one or more chock block apparatus 60 connected thereto.

FIGS. 11 to 15 illustrate a second embodiment of chock block apparatus 160 which operates essentially like the already described first embodiment 60.

The chock block apparatus 160 includes a bar 162, of square tubular shape, having a first end 164 and a second end 166. The first end 164 is secured to longitudinal track 146 so that it cannot be removed therefrom although it can be slid along the track.

Figure 13:
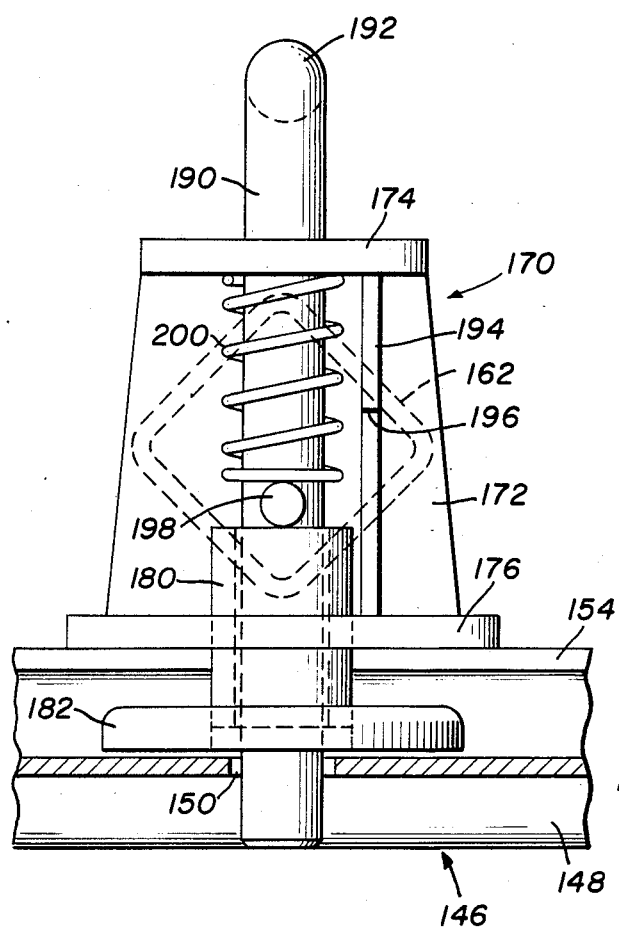
FIG. 13 is an elevational view, partially in section, of FIG. 12 taken along the line 13—13.
Figure 14:
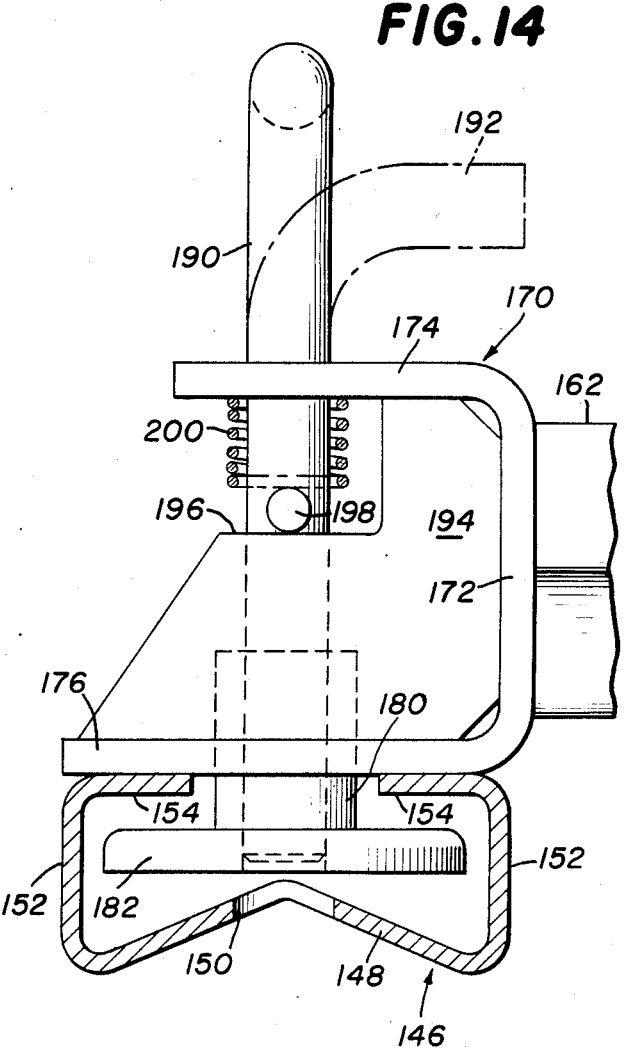
FIG. 14 is a side elevational view of FIG. 13, i.e. rotated 90°, showing the latch out of engagement with the track.
Figure 15:
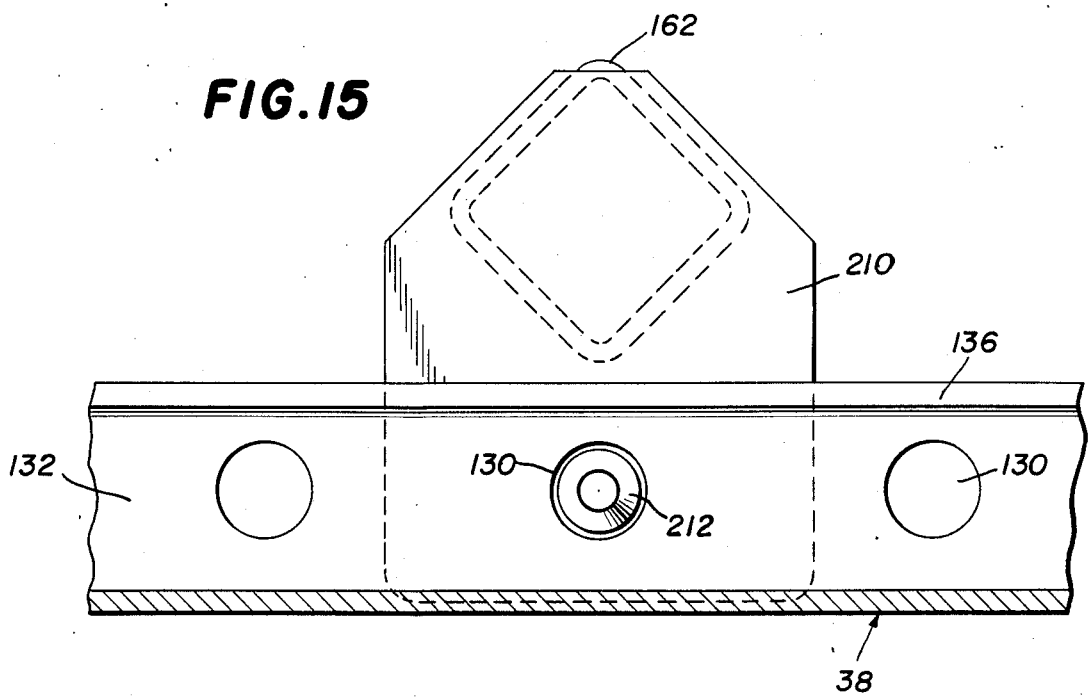
FIG. 15 is an end elevational view, partially in section, of FIG. 12 taken along the line 15—15.

Track 146 has a bottom 148 which is centrally raised and is provided with a line of spaced apart circular holes 150. Additionally, track 146 has two vertical sides 152 and two top horizontal inwardly projecting flanges 154 (FIGS. 12 to 14).

The first end 164 of bar 160 is joined to the vertical wall 172 of bracket 170. Top flange 174 extends out horizontally from the top of wall 172 and bottom flange 176 extends out horizontally from the bottom of wall 172. A vertical circular sleeve 180 extends through a hole in flange 176 and is joined thereto. The lower end of sleeve 180 projects into a hole in horizontal circular disc 182 and is joined thereto (FIGS. 13 and 14). The space between flange 176 and disc 182 provides plenty of clearance for flanges 154 of track 146.

Vertical latch pin 190, having a bent top 192 for gripping, extends loosely through a hole in flange 174 and through sleeve 180. The lower end of pin 190 engages a hole 150 in track 146 in locking position.

Vertical plate 194 (FIGS. 12 to 14) extends between flanges 174 and 176 and is joined thereto and to wall 172. Plate 194 has a horizontal ledge 196 on which pin 198, mounted in latch pin 190, rests when latch pin 190 is in unlocked position. Coil spring 200 is mounted around pin 190 between flange 174 and pin 198. Spring 200 maintains pin 190 in a down and locking position engaged in a hole 130 when the pin 198 is out of contact and below ledge 196. To place pin 198 on ledge 196, the top 192 of pin 190 is lifted manually and rotated until pin 198 rests on ledge 196 and thereby places pin 190 in released or unlocked position.

The second end 166 of bar 162 has a vertical plate 210 joined to it. Pin 212 is joined to the bottom of bar 162 and extends through a hole in plate 210 for a distance sufficient to project through a hole 130 in track 38 (FIG. 12). When so positioned the second end of the chock block apparatus 160 is secured in place for use of the apparatus to hold a vehicle in place.

The described chock block apparatus 160 is used and removed and stowed in the same manner as already described above in connection with apparatus 60. However, when in stowed position chock block apparatus 160 can be prevented from sliding along track 146 by moving pin 190 into locking position so that its lower end can engage a hole 130.

The foregoing detailed description has been given for clearness of understanding only, and no unnecessary limitations should be understood therefrom, as modifications will be obvious to those skilled in the art.

What is claimed is:

1. A railroad car having at least one deck for supporting and transporting four-wheel vehicles such as automobiles and trucks;

a pair of spaced apart first and second parallel tracks, secured to the deck longitudinally of the railroad car, having clearance for the two wheels on one side of the vehicle to roll between the tracks;

a pair of movable chock block means for each vehicle transported on the deck to secure the vehicle against longitudinal movement;

each chock block means including a bar with a first end and a second end;

the bar first end having means which permanently secures the bar first end to the first track so that it is not readily removable from the first track but so that the bar first end can be moved along the longitudinal axis of the track and the bar also can be rotated from about lateral to about parallel to the track to place the second end adjoining the first track;

the bar first end having means for releasably securing the bar first end in a fixed position along the first track;

the bar second end being securable nonpermanently to the second track but having means for releasably securing the bar second end in a fixed position along the second track wherein release of the bar second end from fixed position along the second track requires displacement of the bar first end along the first track for a short distance.

2. A railroad car according to claim 1 in which:
the first track is a channel member with inwardly directed horizontal flanges at the top which terminate in spaced apart position and define a longitudinal gap;
the means which permanently secures the bar first end to the first track includes a vertical member fixedly attached to the bar and extending downwardly through the gap into the space enclosed by the channel; and
the vertical member has a horizontal plate, fixedly connected to it in the space enclosed by the channel, which can be rotated at least about 90° about a vertical axis.

3. A railroad car according to claim 2 in which the plate is substantially circular.

4. A railroad car according to claim 2 in which the second end of the bar has means which fits in the gap of the first track only when the bar is parallel to the track and the bar rests on top of the track.

5. A railroad car according to claim 1 in which the means for releasably securing the bar first end in a fixed position along the first track includes:
a bracket connected to the bar first end;
a latch supported by the bracket;
latch engaging means on the first track; and
means to displace the latch into releasable fixed engagement with the latch engaging means on the first track.

6. A railroad car according to claim 5 in which the means to displace the latch into releasable fixed engagement with the first track includes spring means.

7. A railroad car according to claim 5 including means to retain the latch out of engagement with the first track.

8. A railroad car according to claim 1 in which;
the second track has a series of spaced-apart holes; and
the bar second end means for releasably securing the bar second end in a fixed position along the second track includes at least one pin which engages a hole in the second track.

9. A railroad car according to claim 1 in which the bar can be rotated substantially only horizontally about a vertical axis.

10. A railroad car according to claim 9 in which the bar second end has means engageable with the first track to maintain the bar in stored position resting on the first track top.

11. A railroad car according to claim 1 in which:
the first track is a channel member with inwardly directed horizontal flanges at the top which terminate in spaced apart position and define a longitudinal gap;
the means which secures the bar first end to the first track includes a vertical member fixedly attached to the bar and extending downwardly through the gap into the space enclosed by the channel;
the vertical member being rotatable about a vertical axis and having a horizontal plate, fixedly connected to it in the space enclosed by the channel, which can be rotated at least about 90° about said vertical axis;
the means for releasably securing the bar first end in a fixed position along the first track including a bracket connected to the bar first end;
a latch supported by the bracket;
the latch being horizontally spaced away from the vertical member axis; and
means to displace the latch into releasable fixed engagement with latch engaging means on the first track.

12. A railroad car having at least one deck for supporting and transporting four-wheel vehicles such as automobiles and trucks;
a pair of spaced apart first and second parallel tracks, secured to the deck longitudinally of the railroad car, having clearance for the two wheels on one side of the vehicle to roll between the tracks;
a pair of movable chock block means for each vehicle transported on the deck to secure the vehicle against longitudinal movement;
each chock block means including a bar with a first end and a second end;
the bar first end having means which permanently secures the bar first end to the first track so that it is not readily removable from the first track but so that the bar first end can be moved along the longitudinal axis of the track and the bar also can be rotated from about lateral to about parallel to the track;
the bar first end having means for releasably securing the bar first end in a fixed position along the first track including a bracket connected to the bar first end, a latch supported by the bracket, and means to displace the latch into releasable fixed engagement with latch engaging means on the first track;
the second track having a series of spaced-apart holes;
the bar second end having means for releasably securing the bar second end in a fixed position along the second track including at least one pin which engages a hole in the second track wherein said pin is fixedly secured to said bar second end and substantially horizontal thereto so that release of the pin at the bar second end from a hole in the second track requires displacement of the bar first end along the first track for a short distance.

13. A railroad car according to claim 12 in which:
the first track is a channel member with inwardly directed horizontal flanges at the top which terminate in spaced apart position and define a longitudinal gap;
the means which permanently secures the bar first end to the first track includes a vertical member fixedly attached to the bar and extending downwardly through the gap into the space enclosed by the channel; and
the vertical member has a horizontal plate, fixedly connected to it in the space enclosed by the channel, which can be rotated at least about 90° about a vertical axis.

14. A railroad car according to claim 13 in which the plate is substantially circular.

15. A railroad car according to claim 13 in which the second end of the bar has means which fits in the gap of the first track only when the bar is parallel to the track and the bar rests on top of the track.

16. A railroad car according to claim 12 in which the means to displace the latch into releasable fixed engagement with the first track includes spring means.

17. A railroad car according to claim 12 including means to retain the latch out of engagement with the first track.

* * * * *